April 24, 1934.　　　V. J. KREWETT　　　1,955,883
HOIST AND WHEEL RELEASE
Filed Dec. 28, 1933　　　6 Sheets-Sheet 1
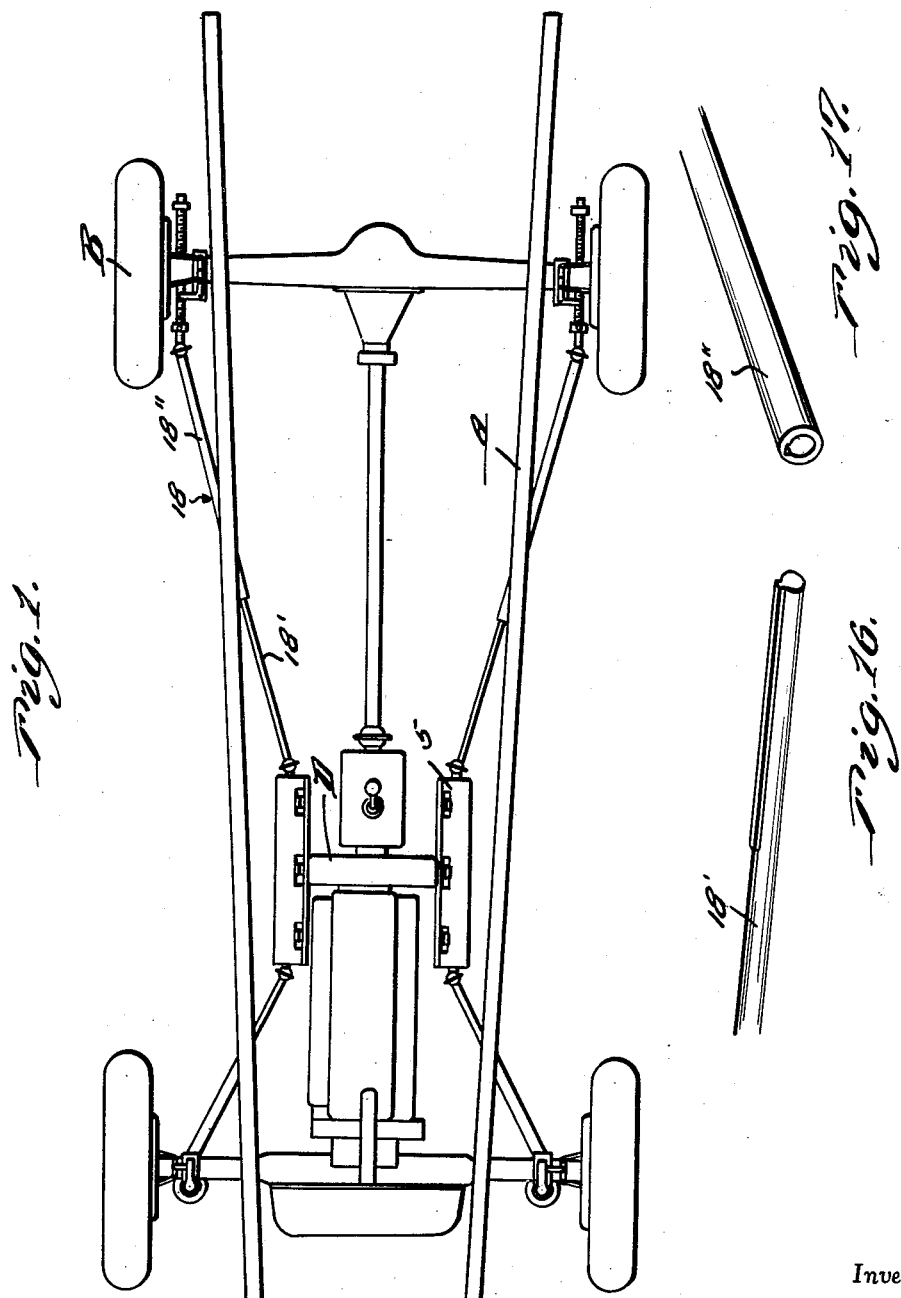
Inventor
Val J. Krewett
By Clarence A. O'Brien
Attorney

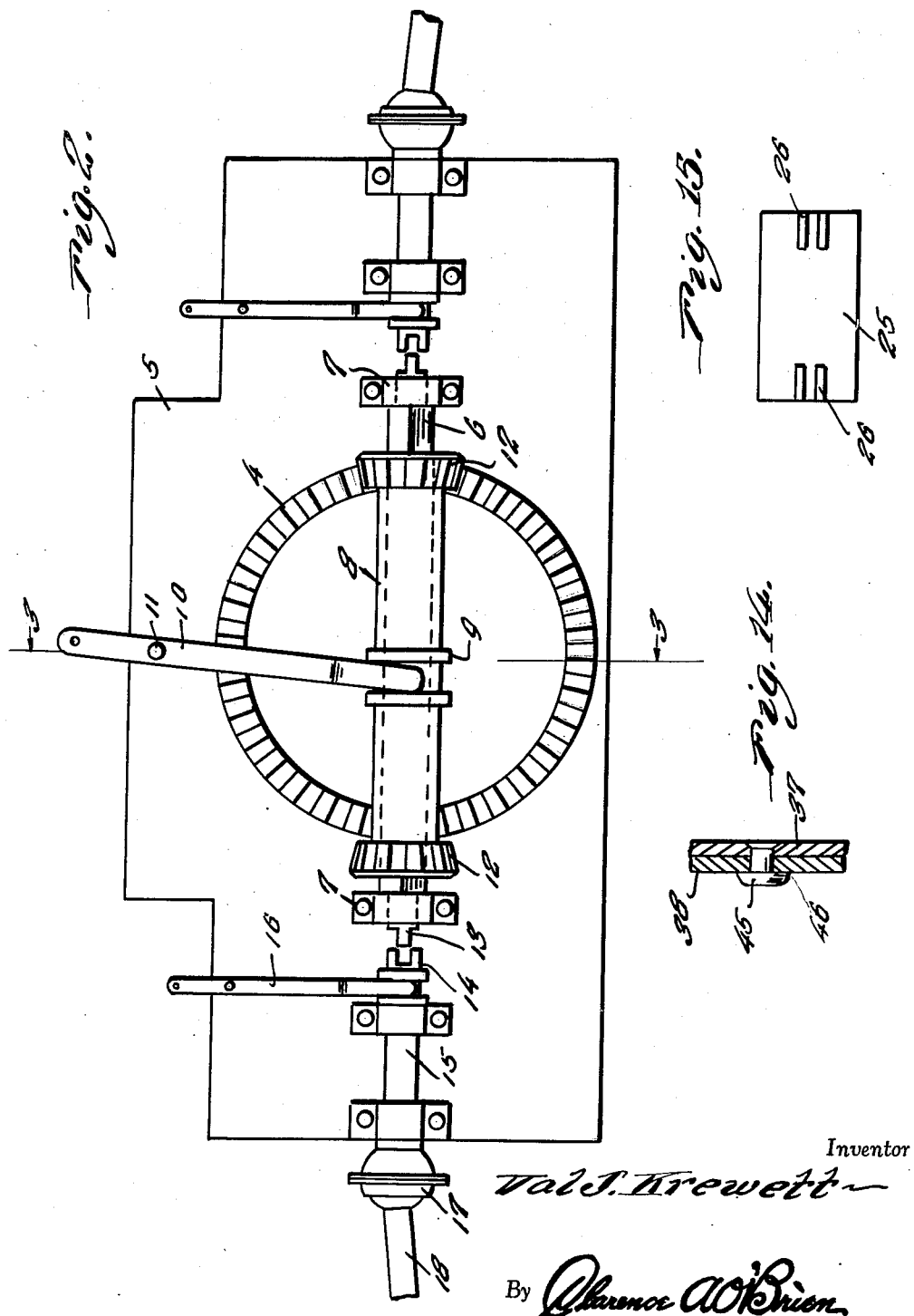

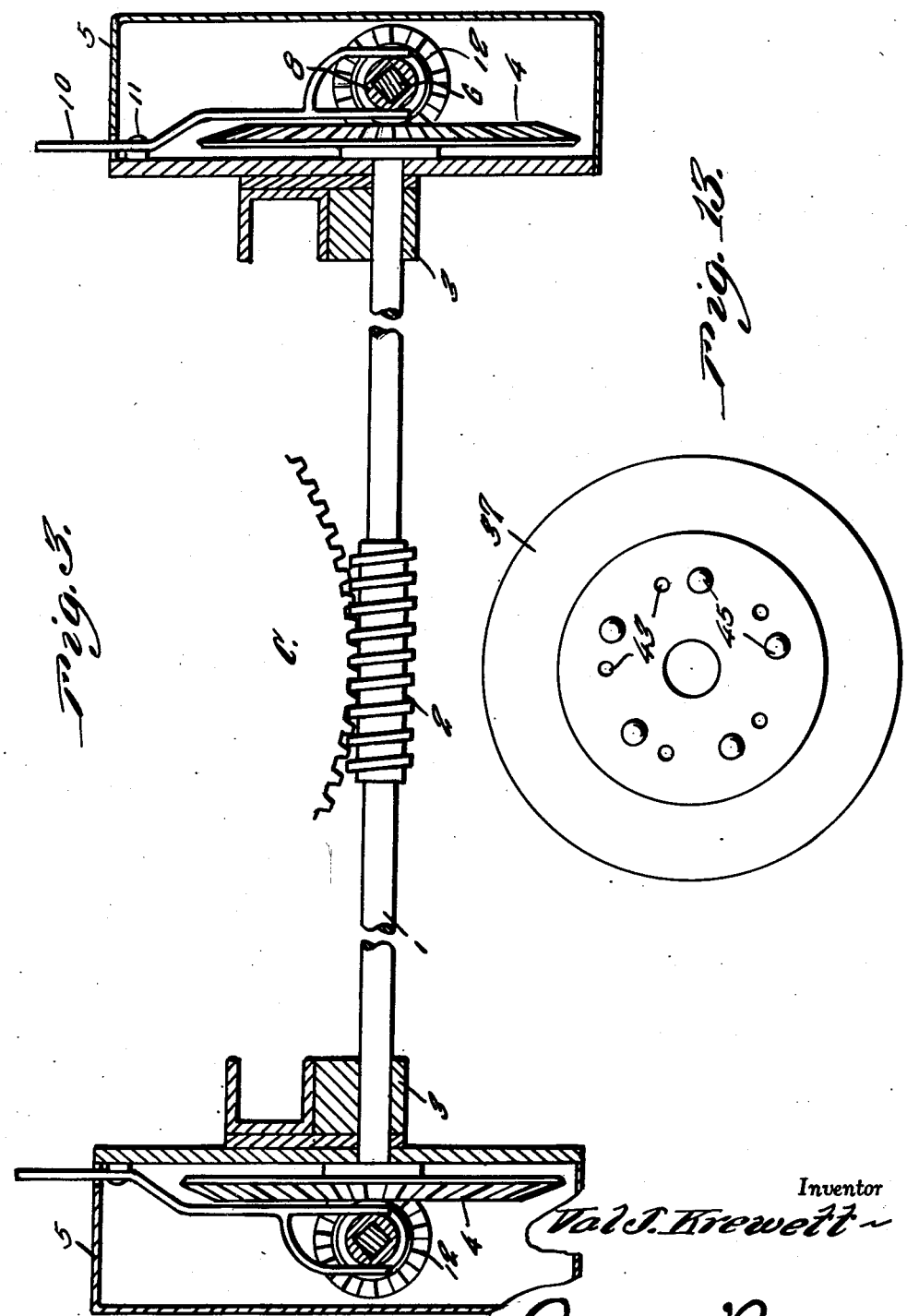

April 24, 1934.  V. J. KREWETT  1,955,883
HOIST AND WHEEL RELEASE
Filed Dec. 28, 1933   6 Sheets-Sheet 4
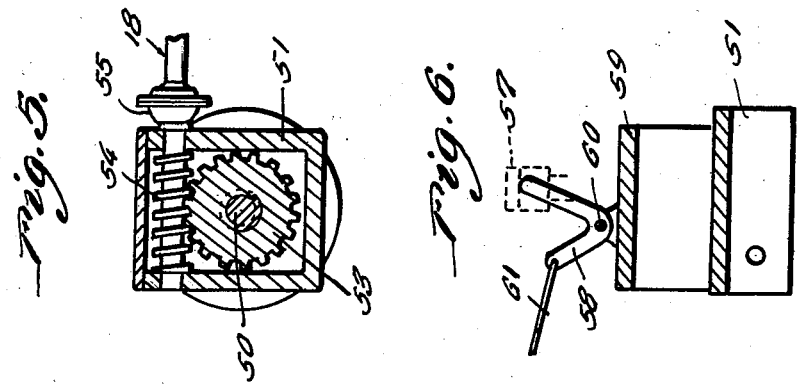
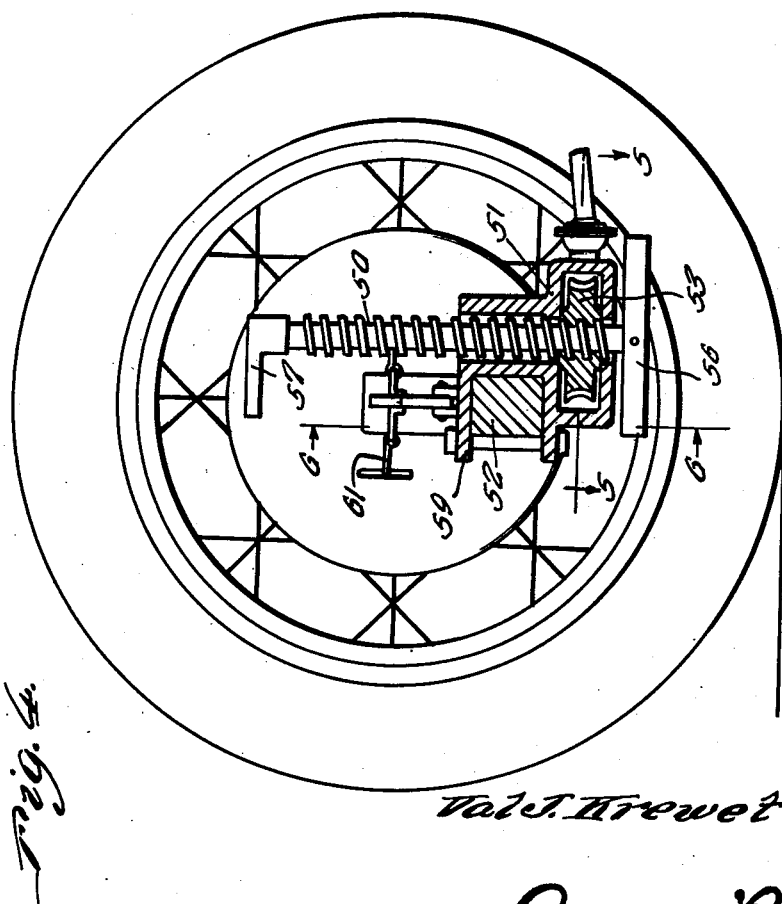
Inventor
Val J. Krewett
By Clarence A. O'Brien
Attorney

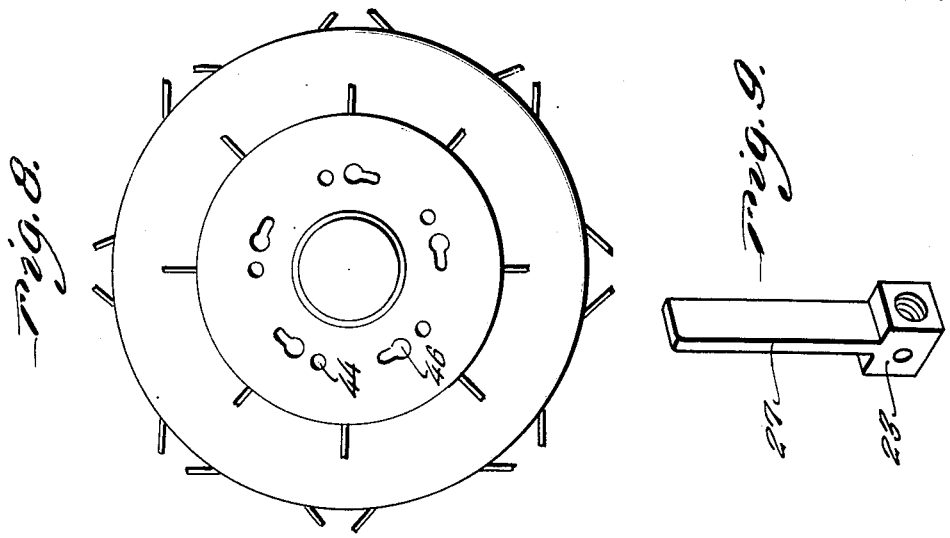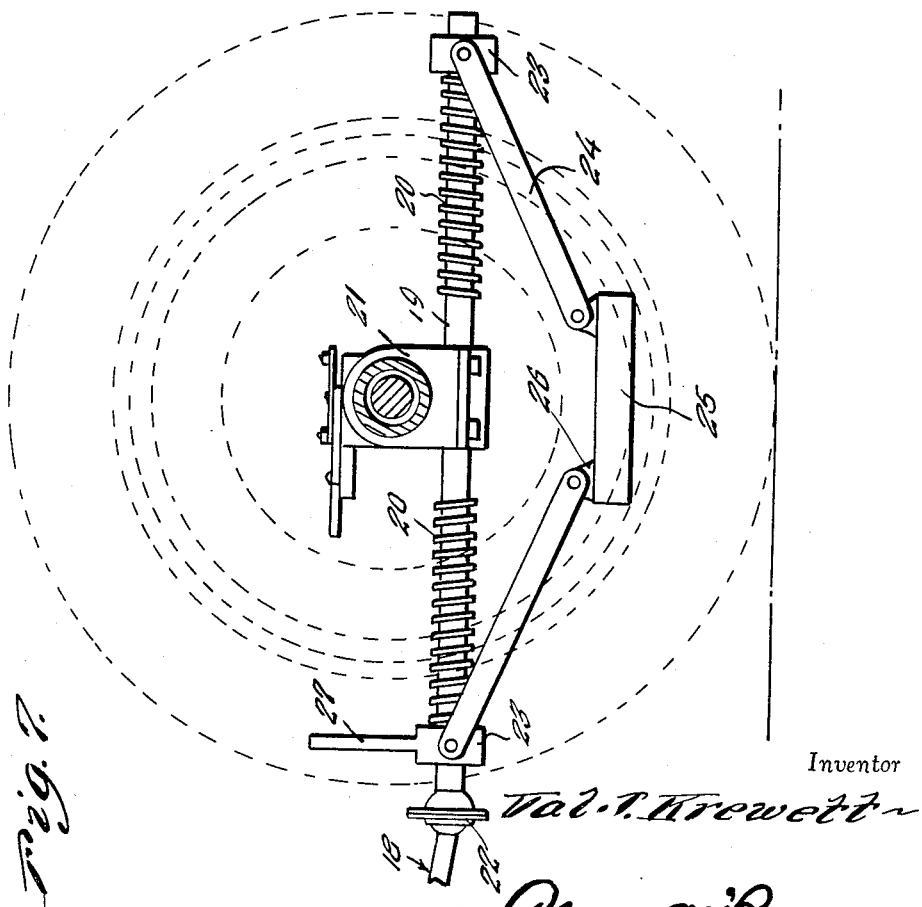

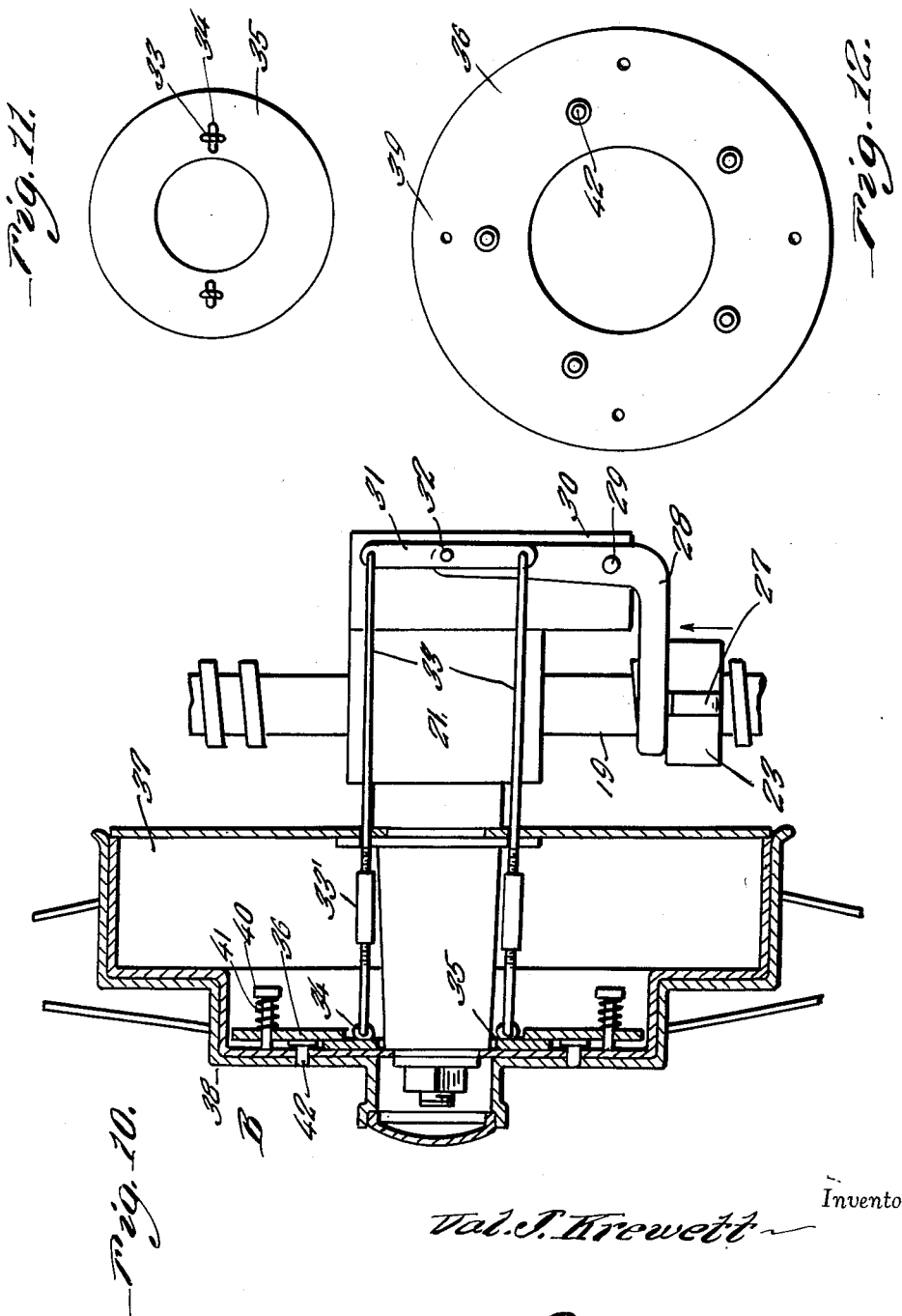

Patented Apr. 24, 1934

1,955,883

UNITED STATES PATENT OFFICE 1,955,883

HOIST AND WHEEL RELEASE

Valentine J. Krewett, East St. Louis, Ill.

Application December 28, 1933, Serial No. 704,345

3 Claims. (Cl. 254—86)

This invention relates to a hoist and wheel release for motor vehicles, the general object of the invention being to provide means operated from the power plant of the vehicle for raising and lowering the wheels and means for locking the wheels to the brake drums, and means for automatically releasing the lock means when the wheels are raised.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a plan view of the chassis of a motor vehicle, showing the invention applied thereto.

Figure 2 is an elevation of the combined drive and clutch means for operating the jacks at each side of the vehicle.

Figure 3 is a section on line 3—3 of Figure 2.

Figure 4 is a view looking toward the inner side of one of the wheels, showing the jack means in section.

Figure 5 is a section on line 5—5 of Figure 4.

Figure 6 is a section on line 6—6 of Figure 4.

Figure 7 is a sectional view through one of the axles, showing the wheel in dotted lines and showing the jack part in elevation.

Figure 8 is a view of a wheel hub.

Figure 9 is a view of one of the nut members with the upright thereon.

Figure 10 is a horizontal sectional view through portion of a wheel and its brake drum, with parts in plan.

Figure 11 is a view of the ring to which the pull rods are connected.

Figure 12 is a view of the large ring which carries the studs.

Figure 13 is an end view of the brake drum.

Figure 14 is a detail sectional view through a part of the hub of the drum and showing how the headed pins act to lock the hub to the drum.

Figure 15 is a view of one of the jack shoes.

Figures 16 and 17 are views of one of the telescopic shafts.

In these drawings, the letter A indicates the chassis of a motor vehicle, the wheels of which are shown at B and a portion of the fly wheel at C, the housing for the fly wheel being shown at D. In carrying out my invention, I provide a transverse shaft 1 which has a worm 2 on its central portion meshing with the teeth of the fly wheel, as shown more particularly in Figure 3, the shaft being supported by the bearings 3 attached to suitable portions of the chassis and a beveled gear 4 is fastened to each end of the shaft 1 and these gears are arranged in the housings 5 suitably supported from the chassis. Thus it will be seen that the shaft 1 and the gears 4 are driven from the power plant through means of the fly wheel. A non-circular shaft 6 is supported in the bearings 7 in each housing 5 and a hollow shaft 8 is slidably arranged on the shaft 6 and carries a centrally arranged grooved collar 9 engaged by the lower forked end of a lever 10 pivoted in the housing 5, as shown at 11, and a small beveled gear 12 is connected to each end of the hollow shaft. Thus by shifting the lever 10 from a neutral central position in one direction, one of the gears or pinions 12 will be placed in mesh with the gear 4, while moving the lever in the opposite direction will place the other gear or pinion 12 in mesh with the gear 4. Thus the shaft 6 can be driven in either direction by the gear 4, but when the lever 10 is in a central position, both of the pinions or gears 12 are out of mesh with the gear 4.

A clutch part 13 is formed at each end of the shaft 6 and a slidable clutch part 14 is carried by the inner end of a stub shaft 15, this clutch part 14 being moved to operative and inoperative position by a lever 16. Thus by manipulating the levers 16, either or both of the stub shafts 15 can be connected with the shaft 6 and by manipulating the lever 10, the stub shafts can be driven in either direction.

A ball and socket joint 17 connects each of the stub shafts 15 with a telescopic shaft 18, the two parts of which are shown at 18' and 18" in Figures 1, 16 and 17, and as shown in Figures 16 and 17, these two sections are keyed together for longitudinal movement, but non-rotatable movement.

As will be seen from Figure 1, the four shafts 18 connect the stub shafts 15 with the four jack assemblies of the front and rear wheels, the stub shafts in one housing 5 being connected by the shafts 18 with the wheels at one side of the vehicle, and the stub shafts in the other housing being connected by the shafts 18 with the wheels of the other side of the vehicle.

Each jack assembly for a rear wheel comprises a horizontally arranged shaft 19 having the right and left screw threads 20 thereon, the inner ends of which are spaced apart and their outer ends are spaced from the ends of the shaft 19. This shaft 19 is rotatably arranged in a bracket 21 attached to the rear axle and the front end of the shaft 19 is connected by a universal joint 22 with the rear end of a shaft 18. A pair of nut members 23 is carried by the shaft 19 and links 24 connect these nut members to a shoe 25 which is formed with the pairs of ears 26 to which the inner ends of the links are pivoted, the shoe being shown in plan in Figure 15. The forward nut member 23 is formed with an upright 27 (see Figure 9) for engaging an end of a bell crank 28 pivoted at 29 to a bracket 30 supported from the bracket 21 when the nut member 23 nears the end of its inward limit of movement so as to rock said bell crank lever on its pivot and thus move inwardly a cross piece 31 which is attached to the inner end of the bell crank lever, as shown at 32, and the ends of this cross piece 31 have the links 33 attached thereto, with the other ends of the links attached to the eyes 34 on a ring 35 so that when the bell crank is swung on its pivot by action of the projection 27 on the nut member 23, the ring is pulled inwardly and thus moves inwardly a large ring 36 arranged in the brake drum 37 of each rear wheel B, the hub of a rear wheel being shown at 38. The large ring 36 has holes 39 therein through which pass the headed pins 40 carried by the brake drum and each pin has a spring 41 thereon which tends to press the large ring 36 outwardly and as this ring overlaps the small ring, it also presses this small ring outwardly against the inner face of the outer end of the brake drum, as shown in Figure 10.

The large ring 36 carries a plurality of outwardly projecting lugs 42 which pass through holes 43 in the outer end of the brake drum and into holes 44 in the outer end of the hub 38 so that these lugs 42 act as latch means for preventing the wheel hub from rotating on the brake drum.

As shown in Figures 13 and 14, the outer end of the drum carries the headed studs 45 which are adapted to engage the keyhole-shaped openings 46 formed in the outer end of the wheel hub, as shown in Figure 8, and when the parts are in a position with the holes 43 in register with the holes 44 so that the pins or lugs 42 can enter said holes, the headed studs 45 will be engaging the small portions of the openings 46 and thus the wheel hub will be locked to the brake drum and the parts cannot be rotated relatively to each other due to the engagement of the pins or lugs 42 engaging the holes 43 in the brake drum and the holes 44 in the wheel hub. However, when the two rings 35 and 36 are moved inwardly by operation of the bell crank, the lugs 42 will be pulled from the holes 44 so that the wheel hub can be rotated on the drum to place the headed studs 45 in the large portions of the openings 46 and then the wheel can be pulled from the drum, as the heads of the studs 45 can pass through the large parts of the holes 46.

Thus it will be seen that as the shaft 19 of each of the rear jack assemblies is rotated in one direction from a shaft 18, the nut members 23 will be engaged by the threaded portions 20 and thus caused to move toward each other and during this movement the links 24 will swing the shoe 25 downwardly until the shoe engages the ground and further movement will lift the wheel off the ground. If the shaft 19 is rotated sufficiently to cause the nut members to run off the inner ends of the screw threaded portions, they will engage the unthreaded inner portions of the shaft 19 and thus no further movement of the jack parts will occur, though the jack will continue to hold the wheel in raised position until the shaft 19 is rotated in an opposite direction, which will cause the nut members 23 to move away from each other and thus the links will lift the shoe 25 so that the wheel can rest upon the ground and the shoe will be in raised position. As before stated, as the nut member 23 carrying the projection 27 nears its inward limit of movement, it will engage the bell crank so as to move the rings so as to pull the lugs 42 out of the holes of the hub to permit the hub to be partly rotated to free it of the headed studs 45 of the brake drum so that the wheel can be readily pulled off the drum.

Each front jack assembly consists of a vertically arranged screw shaft 50 which passes through a housing 51 attached to the front axle 52, said shaft passing through a threaded opening in a worm gear 53 rotatably supported in the lower part of the housing. A worm 54 journaled in the housing 51, meshes with the worm gear 53 and is driven from a front shaft 18 through the universal joint 55. The lower end of the shaft 50 carries a shoe 56 and the upper end of the shaft has an arm 57 attached thereto which will engage a bell crank 58, when the shaft 50 nears the downward limit of its movement. This bell crank is pivoted to the clamp 59 of the housing 51, as shown at 60, and links 61 connect the bell crank with a ring similar to the ring 35, this ring being located in the outer end of the brake drum of each front wheel and operates a ring similar to the ring 36, which is provided with the studs for preventing rotary movement of the wheel relative to the brake drum, as before described.

Thus it will be seen that when the shafts 18 leading to the front wheels are rotated, the shafts 50 will be lowered by means of the gears 53 so that the shoes 56 engaging the ground will raise the front wheels off the ground and just before the shaft 50 reaches its downward limit of movement, the arm 57 will engage the bell crank 58 so as to operate the rings so as to unlatch the front wheel from its brake drum to permit rotary movement of the wheel so as to move the studs 45 opposite the large holes of the slots 46 to permit the wheel to be pulled from the brake drum. As shown in Figure 10, the links 33 are adjustable as to their length by means of the turnbuckles 33' and the links 61 are also adjustable as to their length.

Thus it will be seen that I have provided means whereby either or all of the four wheels of the vehicle can be lifted off the ground through means driven from the power plant of the vehicle, with means for automatically unlatching means which connect the wheel hub to its brake drum so that the wheel can be partly rotated and pulled from the drum, thus enabling a wheel to be easily and quickly raised and removed from the vehicle.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:—

1. In a motor vehicle including its wheels and their brake drums, latch means carried by the drums for holding the wheels to the drums, power driven means for raising and lowering each wheel, and means for moving the latch means to releasing position when the lifting means lift the wheels off the ground.

2. In a motor vehicle including its wheels, means for locking and unlocking each wheel to its brake drum by a partial rotary movement of the wheel relative to the brake drum, latch means for preventing rotary movement of the wheel, a jack assembly for each wheel, means operated by the jack means, when the same has lifted a wheel off the ground, for releasing the latch means, power actuated means for operating the jack means, and manually controlled means for causing the power operated means to move each jack means in either direction to raise or lower a wheel.

3. In combination with a motor vehicle including its wheels, a jack assembly for each wheel, a shaft, means for driving the same from the power plant of the vehicle, a gear connected to each end of said shaft, a housing at each end of the shaft and in which the gear is located, a non-circular shaft rotatably supported in each housing, a hollow shaft slidably arranged on the non-circular shaft, a pinion at each end thereof, manually operated means for moving the hollow shaft to place either pinion in mesh with the gear on the first mentioned shaft, said pinions engaging the gear at opposite sides thereof, a pair of stub shafts in each housing, manually operated clutch means for connecting said stub shafts with the non-circular shaft, telescopic shafts connected by universal joints with the stub shafts, one pair of shafts extending forwardly to the jacks of the front wheels and the other pair extending rearwardly to the jacks of the rear wheels, latch means for connecting each wheel to its brake drum to prevent rotary movement of the wheel relative to the drum, means for locking each wheel to its drum when the latch means are in operative position, such means being moved to releasing position by rotary movement of the wheel relative to the drum when the latch means are in inoperative position, and automatic means operated by the jack means when the same has moved to a position to lift the wheel off the ground for moving the latch means to releasing position.

VALENTINE J. KREWETT.